United States Patent
Wiedeman (10) Patent No.: US 6,418,147 B1
(45) Date of Patent: Jul. 9, 2002

(54) MULTIPLE VOCODER MOBILE SATELLITE TELEPHONE SYSTEM

(75) Inventor: Robert A Wiedeman, Los Altos, CA (US)

(73) Assignee: Globalstar LP, San Jose, CA (US)

(*) Notice: Subject to any disclaimer, the term of this patent is extended or adjusted under 35 U.S.C. 154(b) by 0 days.

(21) Appl. No.: 09/009,910

(22) Filed: Jan. 21, 1998

(51) Int. Cl.[7] .................................................. H04J 3/14

(52) U.S. Cl. .......................................... 370/468; 455/70

(58) Field of Search ........................... 455/12.1, 73, 68, 455/69, 70; 370/468, 435, 342, 433, 465, 316, 318; 375/260; 704/207

(56) References Cited

U.S. PATENT DOCUMENTS

| | | | |
|---|---|---|---|
| 4,677,625 A | * | 6/1987 | Betts et al. |
| RE32,905 E | * | 4/1989 | Baran |
| 4,901,307 A | * | 2/1990 | Gilhousen et al. |
| 5,010,317 A | * | 4/1991 | Schwendeman et al. |
| 5,073,900 A | * | 12/1991 | Mallinckrodt |

(List continued on next page.)

FOREIGN PATENT DOCUMENTS

| | | | | |
|---|---|---|---|---|
| EP | 0 421 698 A2 | * | 10/1991 | |
| GB | 2301268 | | 11/1996 | ............ H04Q/7/30 |
| WO | WO 90/13186 | * | 11/1990 | |
| WO | WO 91/09473 | * | 6/1991 | |
| WO | WO 93/09613 | * | 5/1993 | |

OTHER PUBLICATIONS

US 5,415,368, 05/1995, Horstein et al. (withdrawn)
Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Satellite System before the FCC, Washington, D.C. Dec. 1990, pp. 49–96.
Before the FCC, Washington, D.C. 20554, Aries Constellation Low Earth Orbit Satellite System Proposal of Constellation Communications, Inc. Jun. 3, 1991, Appendix A, B, and C.

(List continued on next page.)

Primary Examiner—Huy D. Vu
(74) Attorney, Agent, or Firm—Ohlandt, Greeley, Ruggiero & Perle L.L.P.

(57) ABSTRACT

A user terminal (16) includes an RF transceiver (30) for transmitting modulated RF signals to a gateway (14) and for receiving modulated RF signals from the gateway via at least one satellite (112). The satellite may be a GEO or a non-GEO satellite. The user terminal further includes a signal processor (32) coupled to the RF transceiver for demodulating received RF signals to digital signals, an audio unit (90,92,94) for transponding speech signals with a user, and a plurality of encoders/decoders (2A,2B) and/or vocoders (82,84,86) between the signal processor and the audio unit for encoding and decoding speech signals passing to and from the audio unit. A first vocoder can be a variable rate vocoder, a second vocoder can be a fixed rate vocoder, where the fixed rate vocoder operates at an average data rate that differs from, e.g., is less than, an average data rate of the variable rate vocoder. The encoder/decoder or vocoder selection is made in the gateway based on one or more criterion such as a presence of an RF signal impairment or RF interference, a predicted and/or actual communications system, a user-selected voice quality, and/or a signal quality received from the user terminal. In one embodiment the vocoder selection command is generated in the terrestrial gateway in response to a request from the user terminal, and in this case the criterion is based on a quality of a signal received from the terrestrial gateway at the user terminal. The selection can be made on the fly on a frame or multi-frame basis.

33 Claims, 5 Drawing Sheets

U.S. PATENT DOCUMENTS

| | | | | |
|---|---|---|---|---|
| 5,081,703 A | * | 1/1992 | Lee | |
| 5,109,390 A | * | 4/1992 | Gilhousen et al. | |
| 5,119,225 A | | 6/1992 | Grant et al. | |
| 5,216,427 A | | 6/1993 | Yan et al. | |
| 5,233,626 A | | 8/1993 | Ames | |
| 5,239,671 A | | 8/1993 | Linquist et al. | |
| 5,265,119 A | * | 11/1993 | Gilhousen et al. | |
| 5,303,286 A | | 4/1994 | Wiedeman | |
| 5,339,330 A | | 8/1994 | Mallinckrodt | |
| 5,410,728 A | | 4/1995 | Bertiger et al. | |
| 5,422,647 A | | 6/1995 | Hirshfield et al. | |
| 5,433,726 A | | 7/1995 | Horstein et al. | |
| 5,439,190 A | | 8/1995 | Horstein et al. | |
| 5,446,756 A | | 8/1995 | Mallinckrodt | |
| 5,448,623 A | * | 9/1995 | Wiedeman et al. | |
| 5,490,136 A | * | 2/1996 | Sereno et al. | |
| 5,551,624 A | * | 9/1996 | Horstein et al. | |
| 5,590,395 A | | 12/1996 | Diekelman | 455/13.1 |
| 5,664,006 A | | 9/1997 | Monte et al. | 455/405 |
| 5,793,425 A | | 8/1998 | Balakrishnan | 348/387 |
| 5,835,498 A | | 11/1998 | Kim et al. | |
| 5,862,178 A | * | 1/1999 | Jarvinen et al. | 375/240 |
| 5,878,387 A | * | 2/1999 | Oshikiri et al. | 704/207 |

OTHER PUBLICATIONS

Application of TRW Inc. for Authority to Construct a New Communications Satellite System Odyssey before the FCC, Washington, D.C. 20554, May 31, 1991 pp. 33–51.

Application of Ellipsat Corporation Ellipsat for the Authority to Construct Ellipso$^R$I An Elliptical Orbit Satellite System, before the FCC, Washington, D.C. 20554, Nov. 2, 1990, pp. 5–34.

Application of Loral Cellular Systems. Corp., Globalstar Mobile COmmunications Wherever You Are, before the FCC, Washington, D.C. Jun. 3, 1991, pp. 94–187.

"An Intergated Satellite–Cellular Land Mobile System for Europe", E. Del. Re, University of Florence, Dept. of Electronics Engineering, italy, Sep. 21, 1989.*

"Current and Future Mobile Satellite Communication Systems", S. Kato et al., IEICE Transactions, vol. F 74, No. Aug. 8, 1991, pp. 2201–2210.*

"Digital Network Oriented Mobile Radio Satallite System as an Integrated Part of the GSM Cellular Radio System in Europe", P. Dondl, Deutsch Bundespost/Fermeldetechniches Zentralmt/Darmstadt,Fed. Rep. Germ. Sep. 21, 1989.*

"The OmniTRACS$^R$ Mobile Satellite Communications and Positioning System", E. Tiedemann, Jr. et al., Vehicle Electronics in the 90's: Proceedings of the In'l. Congress on Transportation Electronics, 10–90.*

"Software Implementation of a PN Spread Specturm Receiver to Accomodate Dynamics", C. Cahn et al., IEEE Trans. on Comm., vol. COM–25, No. 8, Aug. 1977.*

"A Communication Technique for Multipath Channels", R. Price, Proceedings of the IR, Mar. 1958, pp. 555–570.*

"Increased Capacity Using CDMA for Mobile Satellite Communication", K. Gilhousen et al., IEEE Journal on Selected Areas in Communications, vol. 8, No. 4, May 1990, pp. 503–514.

"The Iridium$^{TM1}$ System—A Revolutionary Satellite Communciations System Developed with Innovative Applications of Technology", D. Sterling et al., IEEE, MILCOM 1991, Nov. 4–7.

"Iridium: Key to Worldwide Cellular Communications", J. Foley, Telecommunications, Oct 1991, pp. 23–28.

Yuen et al. "Variable Rate Speech and Channel Coding for Mobile Communication." School of Engineering Science, Simon Fraser University. Jun. 8, 1994.

European Search Report. European Patent Application No. EP 99300413. Dated Dec. 28, 2000.

* cited by examiner

MULTIPLE VOCODER MOBILE SATELLITE TELEPHONE SYSTEM

FIELD OF THE INVENTION

This invention relates generally to satellite-based telecommunications systems and, in particular, to the construction and operation of satellite system user terminals.

BACKGROUND OF THE INVENTION

The overall capacity performance of a mobile satellite telecommunications system can be enhanced by reducing, for a given link power level, the average transmitted data rate. The use of a selective data rate transmission to and from the users is a technique which enables the system to maintain a given user in a connected state during periods of high demand. However, in typical digital communications systems this implies that voice quality is reduced during this period. This is particularly true of mobile satellite communications systems where link margin is a critical concern.

Modern satellite and terrestrial telecommunications systems typically use some type of digital voice encoder with and without compression. The encoder may be embodied as a codec and may include a vocoder for extracting spectral information from speech and compressing and encoding the extracted spectral information. After encoding and compressing, the speech is further modulated and then is transmitted to a receiver where a decoder reconstructs the original speech signal with the use of one or more Digital Signalling Processors (DSPS). The goal of low bit rate vocoders is to efficiently compress and code the speech signal such that it can be transmitted at a bit rate (e.g., 9.6 kbps or less) that is significantly less than what would be required using conventional analog to digital coder/decoder (codec) techniques (e.g., 64 kbps or 32 kbps). As the vocoder rate is reduced there is typically a user-perceptible reduction in the quality of the reconstructed speech at the receiver.

In a satellite transponder-based communications system, such as a geostationary (GEO) or a non-geosynchronous (e.g., a low earth orbit (LEO) or medium earth orbit (MEO)) system, satellite power is an important and critical system resource. In the forward link, from the system to the user, some amount of satellite power is consumed for each user added to the system, with the actual amount of consumed power being a function of the users data rate, the presence of RF obstructions, the presence of external interference, any diversity technique utilized, and other factors. As the data rate for each user is increased more satellite power is required to service an existing pool of active users, thus fewer new users can be serviced by the satellite, resulting in a decrease in overall system capacity.

On the return link, from the user to the system, power is consumed from the user terminal. In particular, hand held user terminals are sensitive to power usage due to battery operation. System capacity for the return link for these mobile systems can be limited by self-interference due to a plurality of user terminals requesting access to, and using, the system. As more users are added to the system, the self-interference increases, causing a power increase in the individual user terminals to overcome the self-interference. The aggregate of the transmitted power of the user terminals can be reduced by decreasing the transmitted data rate from all or a portion of the user terminals. The reduction in data rate thus decreases the power transmitted by the users and thence the self-interference, therefore the system can support an increase in the number of users supported on the return link.

OBJECTS AND ADVANTAGES OF THE INVENTION

It is a first object and advantage of this invention to provide an improved telecommunications system that overcomes the foregoing and other problems.

It is a further object and advantage of this invention to provide a satellite communications system that employs a plurality of different rate vocoders, and that has an ability to switch between the plurality of vocoders based on one or more criteria, on one or more links simultaneously.

SUMMARY OF THE INVENTION

The foregoing and other problems are overcome and the objects of the invention are realized by methods and apparatus in accordance with embodiments of this invention, wherein a satellite communications system employs user terminals and gateways each having, in addition to other equipment, a set of vocoders and codecs comprised of at least two vocoders and codecs. In a presently preferred embodiment of this invention the user terminal has at least two vocoders/codecs implemented in one or more circuits, digital devices, or Application Specific Integrated Circuits (ASICs), and a mechanism to switch between the vocoders/codecs for enhancing a user's ability to hear intelligible speech when operating in the clear or in fading and/or interference environments. A terrestrial gateway detects a user's current communication condition due to fading and signal blockage and/or interference and selects one vocoder/codec from the set of vocoders/codecs that will maximize the user's ability to receive intelligible speech. Alternatively, the system may select a vocoder/codec from a list of available vocoders/codecs for all or a subset of a plurality of user terminals. In another embodiment a single vocoder may have multiple individually selectable encoders and decoders.

In another embodiment multiple vocoders may be selected which are connected to a single codec. It is also within the scope of the teaching of this invention to have multiple vocoders which are composed of multiple individually selectable encoders and decoders which are connected to single or multiple codecs.

A user terminal in accordance with an embodiment of this invention includes a transceiver having an RF module for transmitting modulated RF signals to a terrestrial gateway on the forward link and for receiving modulated RF signals from the gateway via at least one satellite on the return link. The at least one satellite may be a geosynchronous or a non-geosynchronous orbit satellite. The RF signals are modulated to convey speech and signalling information.

The user terminal further includes a signal processor coupled to the RF module for demodulating the received RF signals to digital signals, an audio unit for transponding speech signals with a user, and, in one embodiment of this invention, a plurality of vocoders/codecs coupled between the signal processor and the audio unit for encoding and decoding speech signals passing to and from the audio unit.

At the gateway the equipment includes signal processors coupled to transceivers for modulating and demodulating signals to and from the user units to digital signals and a plurality of vocoders/codecs coupled between the signal processor and the audio unit for encoding and decoding speech signals passing to and from a communications network, such as the PSTN. The vocoders may be of the fixed rate or variable rate type.

In accordance with an aspect of this invention a first one of the plurality of vocoders is a variable rate vocoder, a second one of the plurality of vocoders is a fixed rate vocoder, and the fixed rate vocoder operates at an average data rate that differs from, e.g., is less than, an average data rate of the variable rate vocoder. The fixed rate (or the variable rate) vocoder can thus be selected for use in order to conserve satellite power and to maintain or increase system capacity. The fixed rate vocoder may also operate at a higher average data rate than the average rate of the variable rate vocoder.

The user terminal further includes a controller, responsive to signalling information received from the gateway, for selecting at any given time only one of the plurality of vocoders/codecs for coupling between the signal processor and the audio unit. Likewise the gateway can select for use one of the plurality of vocoders/codecs in its own set of equipment.

The gateway has decision making capability which autonomously, or in response to network instruction, can select encoder/decoders or vocoders to be used on either one of the forward or return links or both.

The selection is made in the gateway based on one or more criterion. The one or more criterion can be a presence of an RF signal impairment within the communication link, a presence of a source of external RF interference, a predicted communications system or channel load, an actual communications system or channel load, a user selected voice quality, and/or a signal quality received from the user terminal. In one embodiment the vocoder selection command is generated in the terrestrial gateway in response to a request from the user terminal, and in this case the criterion is based on a quality of a signal received from the terrestrial gateway at the user terminal. In another embodiment the gateway receives instruction from a network system controller or ground operation control center for optimizing the communications within a network of a plurality of gateways. The selection can also be made based on an optimization of communication link performance, an optimization of a number of active user terminals, a desire to extend user terminal talk time and battery life, or to reduce or otherwise control power within a given satellite beam.

As was indicated above, in a further embodiment of this invention a single vocoder having multiple individually selectable encoders and decoders may be used.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
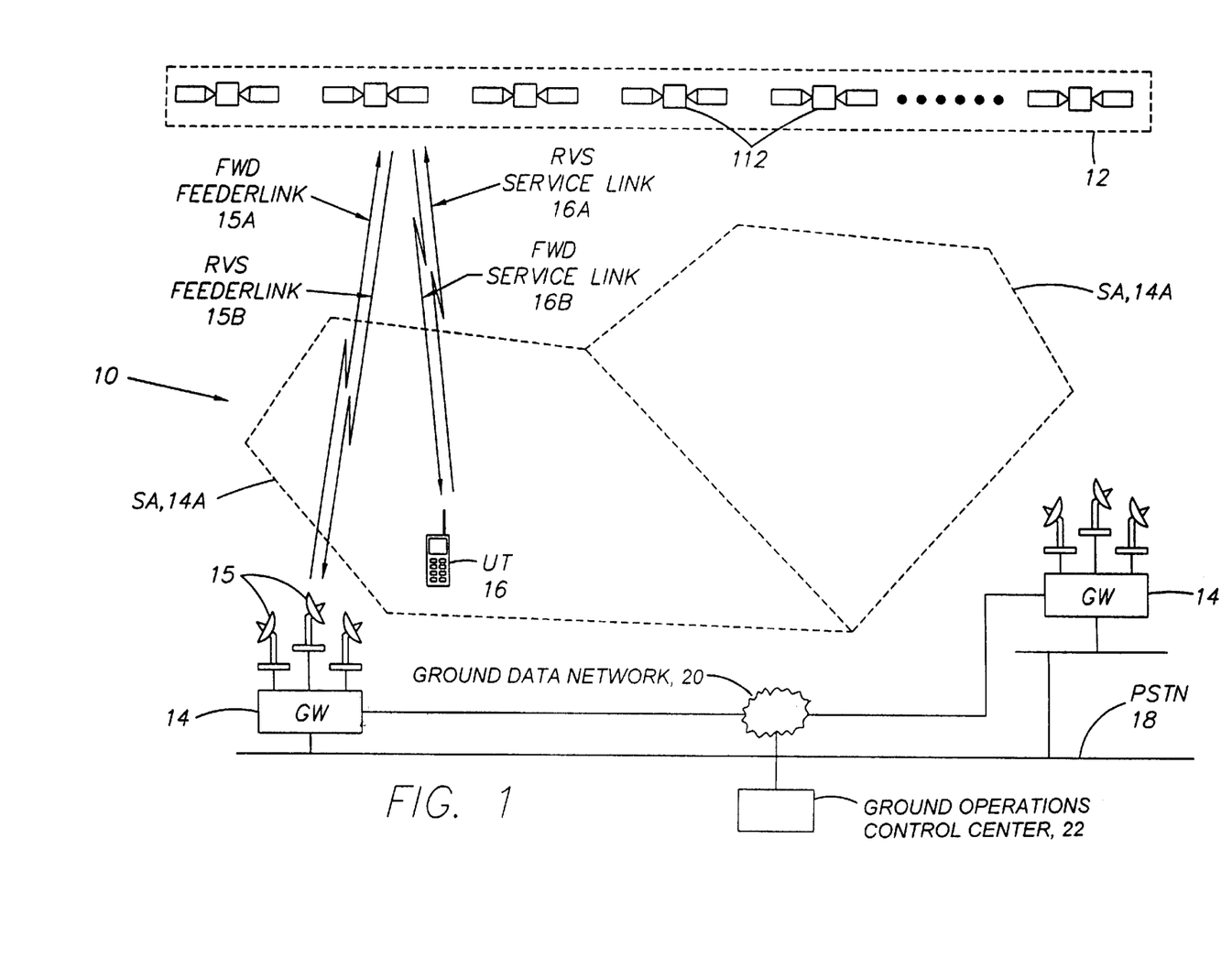
FIG. 1 is a simplified block diagram of a satellite communications system in accordance with this invention, the satellite communications system including a constellation of satellites, PSTN-connected terrestrial gateways (GWs) connected through a ground data network (GDN) to a ground operations control center (GOCC), and handheld, vehicle mounted, or fixed user terminals.

Referring to FIG. 1, a satellite communications system 10 includes a constellation 12 of one or more satellites 112, which may be in geosynchronous or non-geosynchronous orbits, one or a plurality of terrestrial gateways (GWs) 14, and at least one but in general a plurality of user terminals (UTs) 16, only one of which is shown. Each GW 14 has an associated GW service area 14A, and may be, but not necessarily connected to a terrestrial telecommunications network, such as the public switched telephone network (PSTN) 18. A ground data network (GDN) 20 connects the GWs 14 to a ground operations control center (GOCC) 22. The GOCC 22 is responsible, among other things, for deriving short or long term system resource allocation plans based at least in part on historic system usage patterns or real time system loading, and for communicating these plans to the GWs 14. The GWs 14 are responsible for implementing the short or long term plans, as well as for making real-time adjustments to the plans to accommodate fluctuations in demand, the presence of RF signal obstructions or interference and blockages between the satellites 112 and the UTs 16, momentary fades, the presence of interference from external sources, and other factors that can influence the operation of the system 10.

The satellites 112 may project a multi-beam pattern on the ground, and a given GW 14 and UT 16 will generally each be in one beam (the same or different beams) at any given time.

The UT 16 receives signals relayed through the satellites 112 to and from the GWs 14. GW antennas 15 provide forward feederlinks 15A and reverse feederlinks 15B, and for a non-geosynchronous (e.g., LEO or MEO) satellite case are capable of tracking the satellites 112 as they move across the sky. The satellites 112 can be bent pipe repeaters, or may have on board switching, and transmit a forward service link 16A to the UT 16 and that receive a reverse service link 16B from the UT 16. The UT 16 will generally be connected to the PSTN 18 though the GW 14, whose service area 14A contains the UT, and through one or more of the satellites 112. In a preferred embodiment of this invention the feederlinks 15A, 15B and the service links 16A and 16B are direct sequence (DS)-CDMA links, although in other embodiments TDMA or FDMA links could be used as well.

Reference can be had to the following U.S. Patents for teaching embodiments of satellite communications systems that are suitable for use in practicing this invention: U.S. Pat. No. : 5,233,626 issued Aug. 3, 1993, "Repeater Diversity Spread Spectrum Communication System", Ames; U.S. Pat. No. 5,592,481 issued Jan. 7, 1997, "Multiple Satellite Repeater Capacity Loading With Multiple Spread Spectrum Gateway Antennas", Wiedeman et al.; U.S. Pat. No. 5,448, 623 issued Sep. 5, 1995, "Satellite Telecommunications System Using Network Coordinating Gateways Operative With A Terrestrial Communication System", Wiedeman et al.; U.S. Pat No. 5,303,286 issued Apr. 12, 1994, "Wireless Telephone/Satellite Roaming System", Wiedeman; U.S. Pat. No. 5,619,525 issued Apr. 8, 1997, "Closed Loop Power Control For Low Earth Orbit Satellite Communications System", Wiedeman et al.; and U.S. Pat. No. 5,422,647, issued Jun. 6, 1995, "Mobile Communication Satellite Payload", Hirshfield et al. The disclosures of these U.S. Patents are incorporated by reference herein in their entireties.

Figure 2:
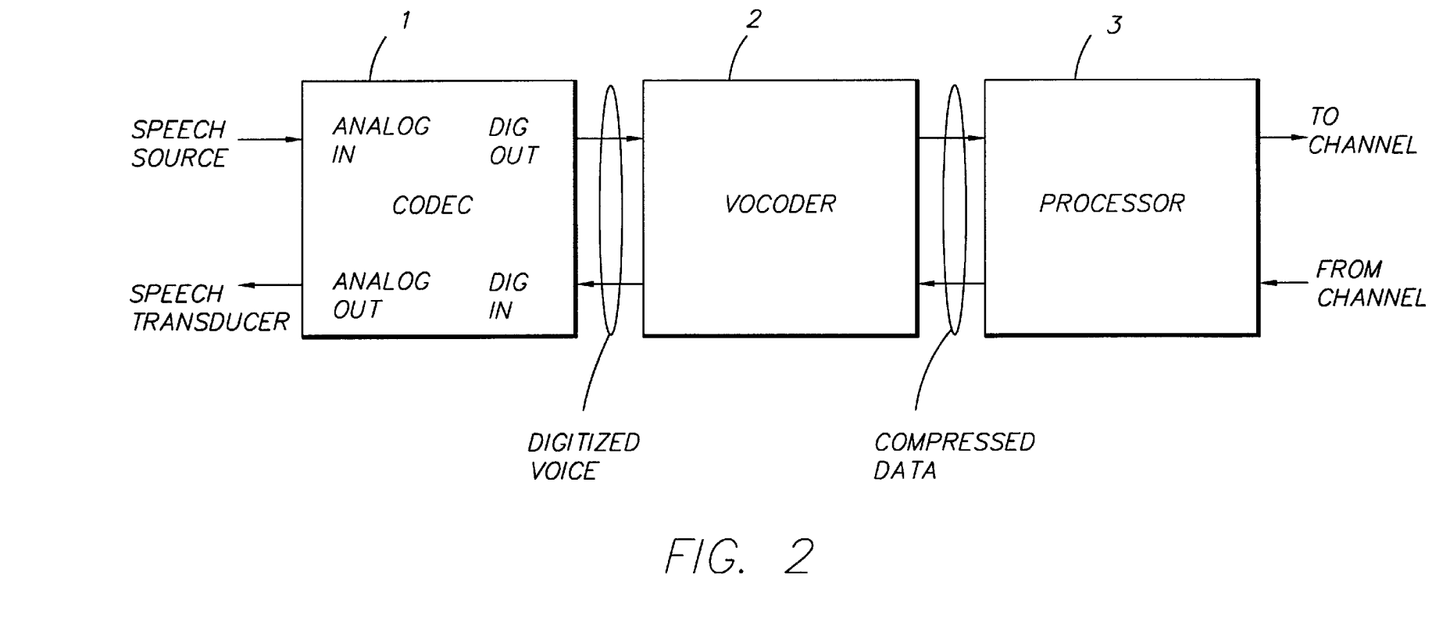
FIG. 2 is a block diagram of a typical codec/vocoder/data processor system.

In general, speech compression systems with a communication device use three devices in conjunction with input/output devices. The three devices are a codec or an analog to digital converter (A/D Converter or ADC) 1, a vocoder 2, and a processor 3, as shown in FIG. 2. Henceforth a reference to a codec is assumed to include a reference as well to an ADC.

The codec 1 is used to digitize the voice, converting analog to digital and the reverse. There are several commercially available voice companders. The "$\mu$-Law" compander is commonly used by the North American Bell System and the "A-law" commander is commonly used by European Telephone Systems. These systems generally change speech from analog to 64 kbps digital signals and/or convert 64 kbps digital signals to analog. While in one aspect the teaching of this invention generally describes switching of the codecs and the vocoders, it should be realized that this is not required and that the vocoder 2 itself is the only device which may need to be switched in many instances.

Figure 3:
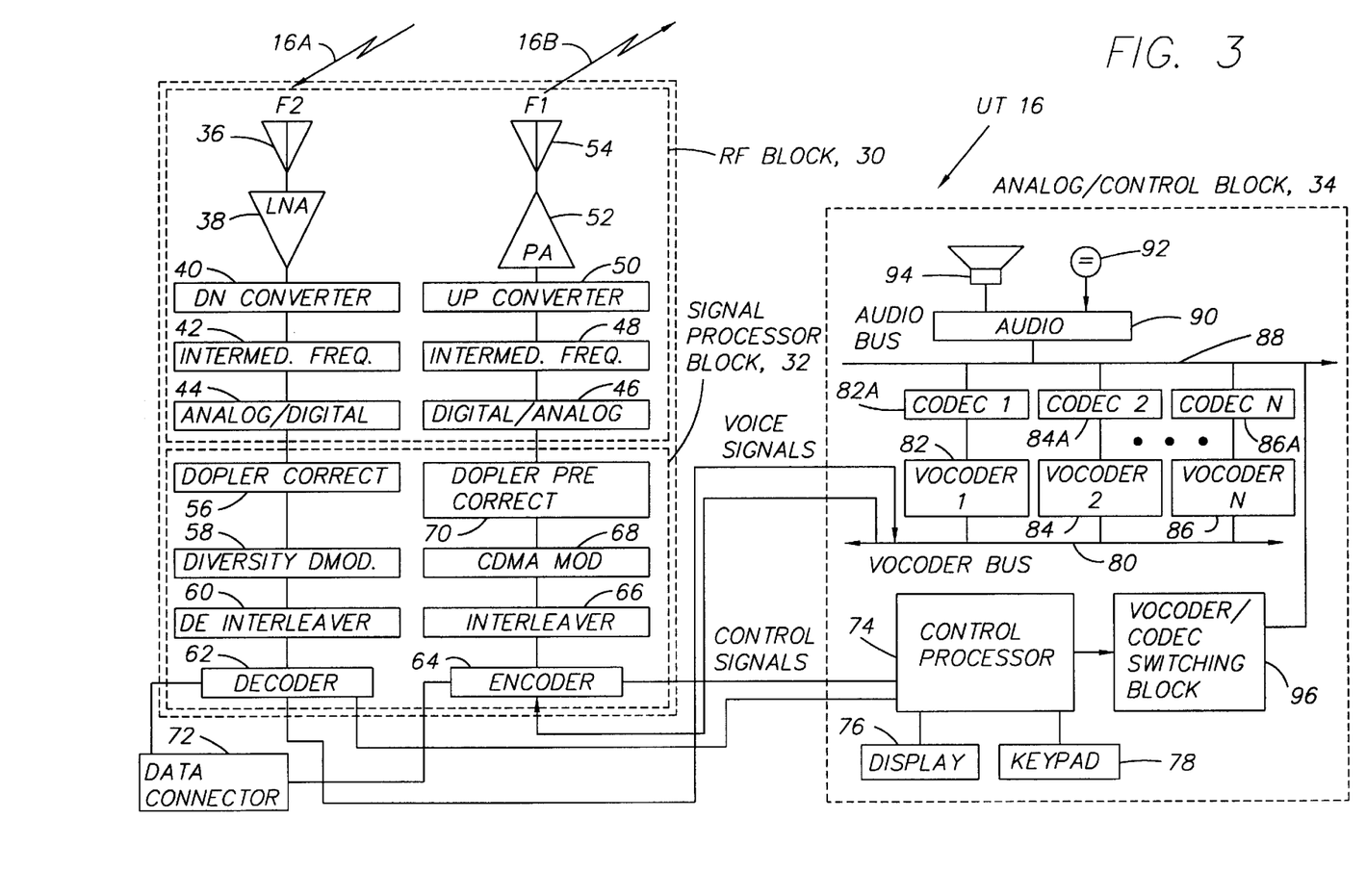
FIG. 3 is simplified block diagram of the user terminal shown in FIG. 1.

Reference is now made to FIG. 3 for showing the UT 16 in greater detail. The UT 16 includes three major subsections. These are a transceiver comprising an RF module or block 30, a signal processor block 32, and an analog (speech)/control block 34. The RF block 30 is connected to a receive antenna 36 and includes a low noise amplifier (LNA) 38, a down converter 40 (e.g. from S-band), an intermediate frequency (IF) block 42 and an analog/digital converter (ADC) 44. The RF block 30 also includes a digital/analog converter (DAC) 46, IF block 48, an up converter 50 (e.g., to L-Band), and a power amplifier (PA) 52 connected to a transmit antenna 54. The signal processor block 32 has a receive side and a transmit side connected to the receiver portion and the transmitter portion, respectively, of the RF block 30. The receive side includes a Doppler correction block 56, a diversity demodulator 58 such as a rake receiver, a de-interleaver 68 and a decoder 62. The transmit side includes an encoder 64, an interleaver 66, a CDMA modulator 68 and a doppler pre-correction block 70. A data connector 72 may be provided for connecting directly to the decoder 62 and the encoder 64.

Of most interest to the teaching of this invention is the analog/control block 34. This block contains a control processor 74 (e.g., a 386-based processor) connected to a user interface comprised of a display 76 and a keypad 78. The control processor 74 provides appropriate control signals to the decoder 62 and encoder 64, as well as other control signals as required to other blocks. The decoder 62 outputs digital voice signals at baseband to a vocoder bus 80 and the encoder 64 receives digital voice signals from the vocoder bus 80. The vocoder bus 80 is connected, in accordance with an aspect of this invention, to a plurality (N) of vocoders 82, 84 and 86. Although more than two vocoders are shown, the value of N may range from two up to any number of vocoders. Each vocoder has an associated codec 82A, 84A and 86A connected to an audio bus 88 and thence to an audio processing block 90 that transponds speech signals with a user by receiving a speech input from a microphone 92 and by outputting a reconstructed speech signal to a loudspeaker 94. The control processor 74 also provides controlling signals to a vocoder/codec or ADC switching block 96 which enables one of the vocoders 82, 84, 86, and associated codec, to be active at any given time. Multiple vocoder outputs are possible by transmitting alternate frames or series of frames with differing vocoders selected. The switching block 96 may, for example, selectively enable and disable input and output data buffers of the vocoders 82–86 so as to insure that typically only one of the vocoders is fully operational and connected between the vocoder bus 80 and the audio bus 88 at any given time. The various vocoders 82–86 may all be implemented in a single ASIC or in a DSP, along with other portions of the illustrated circuitry.

It should be realized that each of the GWs 14 includes similar circuits (RF block, signal processor block, analog/control block) for each UT 16 that is actively engaged in a call. That is, the GW 14 also includes a corresponding bank of selectable vocoders, and a switching block, for each UT 16. In the GW 14, however, the audio block 90, microphone 92, and loudspeaker 94 are typically replaced with an interface to the PSTN 18 for connecting voice calls between the UTs 14 and remote telephones, or are otherwise interfaced to using devices. It should be noted that in some embodiments it may be desirable to provide at least some audio circuits also at the GW 14.

In accordance with this embodiment of the invention the UT 16 is constructed in a manner so as to have multiple vocoders and codecs (or A/D converters), and is equipped with circuitry to switch between them. There is also circuitry for receiving control signals from the GW 14, such that the UT control processor 74 can select the appropriate vocoder and codec to use during a call. Relatedly, each of the GWs 14 is enabled to determine when it is advisable to instruct the UT 16 to switch from one vocoder/ADC to another vocoder/ADC, such as from the vocoder 82/ADC 82A to the vocoder 84/ADC 84A, and to then transmit the required switching signal to the UT 16, via one or more of the satellites 112, during a call. Preferably some hysteresis is provided to prevent the control signals from excessively switching vocoders during an occurrence of transient signal propagation conditions.

A UT 16 in the clear, i.e., one that has an unobstructed view of one or more of the satellites 112, receives the GW-transmitted vocoder control signal and has a default vocoder selected for the call (e.g., the vocoder 82). While the call is in process the UT 16 may be positioned in a manner that causes the signal to be faded. This can be caused by any of a number of conditions. However, for illustrative purposes consider a signal blockage caused by a building, tree, or some other RF obstruction. Alternative causes of fading may be excessive interference from another mobile satellite system, or from some other external interference source.

The UT 16 is assumed to be given a signal having a certain (e.g., maximum) quality using the default vocoder. By example, the default vocoder may be a variable rate vocoder operating with a peak rate of 9600 bps 10% of the time, a rate of 4800 bps 50% of the time, and a rate of 2400 bps 40% of the time. The default vocoder may thus have an average rate of 2800 bps, when VOX operation, assuming 40% talk time, is considered.

Automatic circuitry can be employed to reduce the vocoder peak data rate during blocking, fading and interference conditions to, for example, 4800 bps, and to thus deliver 3 dB more power (energy/bit) during the transmission on the return link. However, since the average vocoder rate is only reduced from 2800 bps to, for example, 2500 bps there is not a significant improvement in system capacity, with a slight decrease in link quality. The automatic rate reduction is similar to that used in some facsimile machines to automatically adjust the data rate as a function of noise on the telephone line.

In order to provide the UT 16 with an improved voice quality during fading, blocking or interference conditions, multiple vocoders, or multiple encoders and decoders within a single vocoder, can be used. By example, a variable rate vocoder (e.g., the vocoder 82) and a fixed rate vocoder (e.g., the vocoder 84), which runs at a significantly lower data rate, may be incorporated into the UT 16 and into the GW 14. The fixed rate vocoder 84, by example, may operate at a rate of 2400 bps, which has an average rate of 960 bps with VOX operation. That is, and considering the normal pauses during speech when the vocoder is not required to transmit encoded speech data, the effective data rate is only 960 bps. It can be shown that there is a significant improvement in efficiency by switching to the lower rate vocoder 84 during the transmission, and by putting the same power into the signal at an average rate of 960 bps as would be allocated to the 2800 bps (average) variable rate vocoder 82. By this means the Energy per bit divided by the Noise (Eb/No) is maintained at a near constant level at the remote receiver.

The fixed rate vocoder may also operate at a higher average data rate than the average rate of the variable rate vocoder.

Alternatively, the UT 16 could select the lower rate vocoder at the same power and reduce its transmit power, thus increasing the battery life or talk time significantly. Automatic circuitry may switch this mode in and out according to battery state of charge. This technique can be used to limit power in any given satellite beam.

It should be noted that this improvement can be realized on either end of the link. For example, the UT 16 may determine that it requires a better signal, and may then notify the GW 14 to reduce its data rate, while maintaining the same power, by switching to a lower rate vocoder in the GW 14. Conversely, the GW 14 may be receiving the signal from the UT 16 and, detecting that its performance is degraded, notifies the UT 16 to switch to the lower rate vocoder 84. Once the blockage, obstruction or interference is removed, the system can reestablish the operation of the higher rate vocoder 82 by sending another switching command.

It should be noted that it is not necessary that the links maintain symmetry of vocoder choice, as there could be one set used on the forward link and another set on the return link thus optimizing each link independently.

A consideration is now made of a UT 16 that is in motion during a call. Assume that the communication link is established in the forward direction in the clear with two diversity paths from two low earth orbit satellites 112. The GW 14 splits between the two satellites 112 the power necessary to close the link. The diversity receiver (e.g., a multi-finger rake receiver) at the UT 16 receives the two signals and after down conversion, despreading and decoding sends the signal to the vocoder 82 for audio reproduction. Assume that the UT 16 is transmitting with a few milliwatts of power, and the transmitted signal is repeated through the two (or more) satellites 112 that are in view of the UT 16 and are received on the reverse feederlink 15B by the GW 14. The GW 14 receives the multiple signals from the satellites 112 in view of the UT 16 with a rake receiver, and after downconverting, despreading, and decoding sends the signal to a GW vocoder for audio reproduction. At some point the UT 16 moves behind an obstruction (e.g., the user moves the UT 16 under a tree) and the GW 14 observes that the signal received at the GW suddenly disappears from one of the satellites 112 (in this case the obstruction is between the UT 16 and only one of the satellites 112 that are in view of the UT 16). The GW 14 compensates for the loss of signal by increasing the signal level on the remaining (unobstructed) satellite 112.

In accordance with the teaching of this invention the GW 14 may at this point also command that the lower rate vocoder be used, and thus save important satellite power. However, for illustrative purposes assume that there is sufficient margin in the link to maintain the higher rate vocoder power demand. The UT 16 automatically increases its power, or is instructed to increase its power by the GW 14, to compensate for the loss of the blocked satellite on the return link. Assume further that at some later time the signal from the remaining satellite 112 begins to fade. This can be caused by external interference or some other fading mechanism, such as specular reflection. In any case, a minimum signal quality threshold value is eventually reached at the GW 14, the GW 14 forms a control instruction and, during the call, transmits the control instruction to the UT 16 using some pre-agreed upon signalling protocol. The UT 16 receives the control instruction and, after decoding same, sends the decoded instruction to the control processor 74. In response, the control processor 74 issues a switching instruction to the vocoder/codec switching block 96. The switching block 96 then activates the lower rate vocoder 84/codec 84A combination, and begins transmission over the link at the lower data rate.

At some point the UT 16 may also request that a lower rate be transmitted by the GW 14 in order to combat fading on the forward link. Typically the GW 14 can sense this condition due to the similarity of the forward and reverse links. However, since these links are totally independent it is not necessary for the system to be employed with a UT link request capability, and the GW 14 could instruct both the forward and the return links to use the lower rate vocoder at the same time. In any case, at some point the GW 14 senses that the link will again support the higher rate vocoder 82 (e.g., the user has moved away from the RF obstruction) and signals the UT 16 to return to the higher rate vocoder 82.

The vocoder switching technique described above may also be used during peak communication times to increase the overall capacity of the system 10. In this case the higher rate vocoder 82 is used during off-peak times for all UTs 16, thus maximizing the quality of service. During peak traffic periods all or a selected number of UTs 16, depending on traffic demand, can be commanded to use the lower rate vocoder 84, thus optimizing the utilization of some satellites 112 while retaining others of the UTs 16, using the higher vocoder rate, on other satellites.

Traffic predictions can be made at GOCC 22 based on historic traffic data or in near real time, and a plan is derived for vocoder selection at certain GWs 14 at certain times. The plan can be implemented by sending instructions to the GWs 14 via the GDN 20. In turn, the GWs 14 instruct the UTs 14 on the fly to change vocoder selection in accordance with the GOCC-originated instructions, and may subsequently modify the plan as required due to changes in signal path impairments, an appearance of an external interference source, and other criteria.

Using the foregoing technique it is possible to increase the capacity of the system 10 by, for example, 4 dB or more by universally reducing vocoder rates from the variable rate vocoder 82, operating at an average rate of 2800 bps, to the fixed, lower rate vocoder 84 operating at a 960 bps average rate. The additional vocoder(s) 86 provide the ability to selectively operate at yet another fixed rate, or within some other range of variable rates.

It is also within the scope of the teaching of this invention to command the UT 16 to use different vocoders according to a quality of service plan selected by the user for a call, a series of calls, a session, or for a predetermined time. In this manner a particular user may wish to select a higher quality service providing a more robust signal, while another user may select a lower quality, and less expensive service. As an example, a certain group of users may decide to accept a lower quality of service with a lower voice quality, since they typically operate in a clear environment. This set of users could be temporarily or permanently switched to the lower rate vocoder 84 that consumes less satellite power, thus increasing the system capacity for other users that desire a higher quality service that consumes more satellite power. Since the GW 14 has knowledge of the vocoder switching state of each UT 14 and the resources used, the GW 14 can properly bill the user by determining the vocoder in use and providing this information to the billing system. Likewise, the GW 14 may instruct the call summary data provided to the GOCC 22 as to the use of the system 10 by the various users. That is to say, the GW 14 can record the number of users operating at the higher vocoder rate, on a minute by minute basis, as well as those operating at the lower vocoder rate, and form the proper message for instructing the GOCC 22, via the GDN 20, of this information. The billing system used by the satellite capacity provider can thus properly bill the owner of the GW 14 for the usage of the system.

Thus far the discussion has been made in the context of the switching of entire vocoders or vocoder/codec combinations, and the use of different types of vocoders (i.e. fixed rate and variable rate). However, the teaching of this invention is not limited in this regard to the use of multiple vocoders of these different types. For example, multiple versions of the same type of vocoder may be used. As an example of the utilization of multiple vocoders of a single type (e.g. CELP), multiple speech coding algorithms may be used and the system may switch between them at will.

While it may be convenient to switch entire vocoders, as described above, it should be further realized that the benefits of this invention can also be produced by switching between encoders and decoders on a single vocoder chip.

Figure 4:
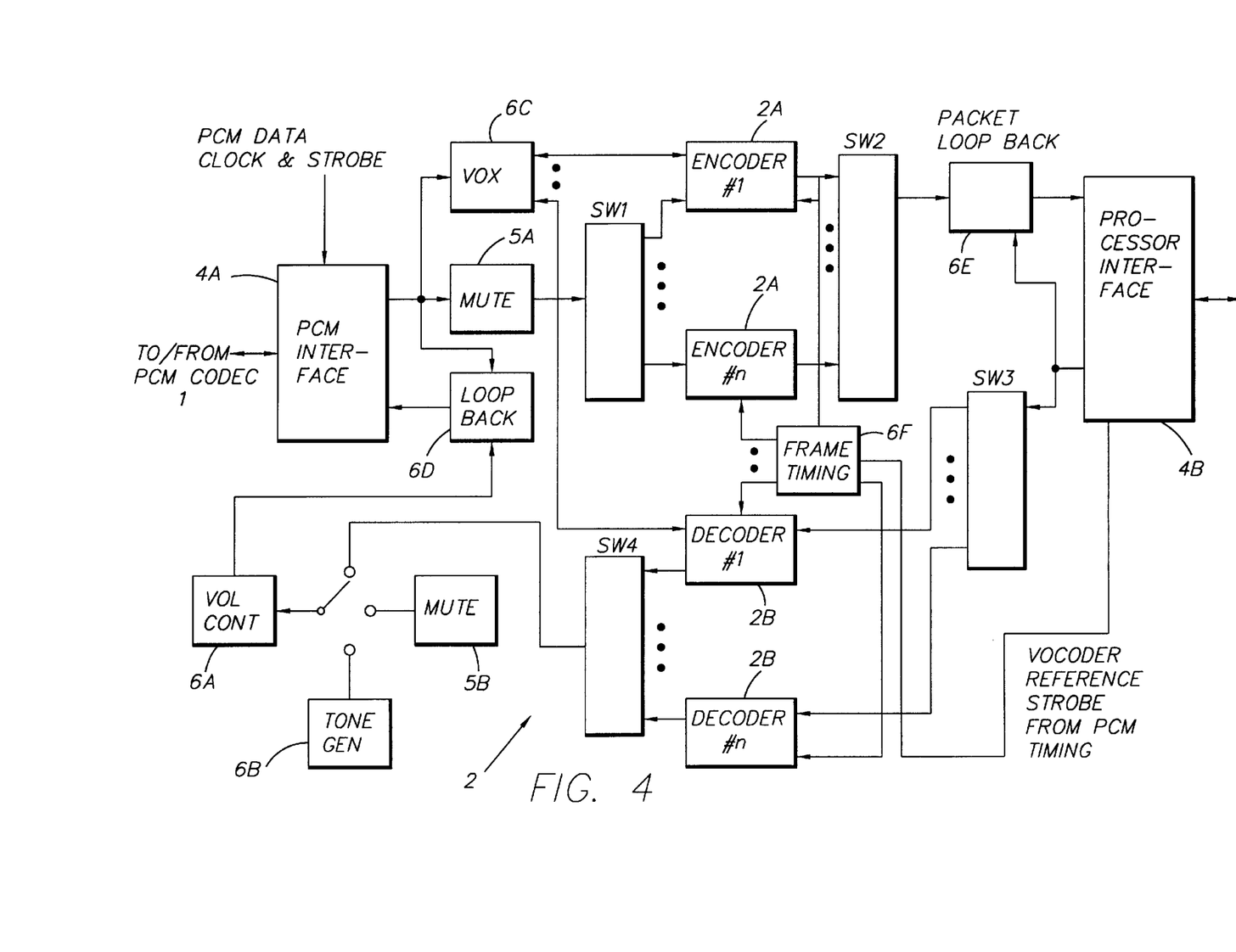
FIG. 4 is a block diagram of vocoder having multiple encoders and decoders.

A vocoder 2 with switchable encoders 2A and decoders 2B is shown in FIG. 4. A PCM interface 4A sends and receives either $\mu$-Law or A-Law PCM data to and from the codec 1 (not shown), and sends/receives commands and compressed data to and from the system processor 3 (not shown). The input and output muting blocks 5A and 5B allow muting of the input and output speech, respectively. The output volume control 6A adjusts the output volume. A tone generator 6B provides single or dual frequency tones, including DTMF, to the codec 1. The VOX 6C is a voice activated switch which cuts off the transmit function and switches in the receive function. An audio loopback 6D feature allows testing of the PCM interface 4, while a packet loopback function 6E allows testing of a processor interface 4B. The processor interface 4B receives speech data from and transmits speech data to the processor 3 (not shown). Vocoder timing and control signals can also be applied, through the processor interface 4B, to a frame timing block 6F.

In accordance with this embodiment of the invention a plurality of switches (SW1–SW4) are used for selecting one encoder 2A/decoder 2B pair for operation at any given time.

A typical encoder 2A operates in the following manner. The encoder 2A operates on one frame at a time. As an example, a 20 ms frame may have 160 samples of speech. The encoding process includes measuring the speech energy, data rate determination (for variable rate vocoders), dynamic adjustment of rate thresholds, and encoding of the speech into packets of compressed data. In the example the encoder 2A provides a 25 byte packet of data to the processor 3 for each 20 ms frame. Each encoded packet contains one byte that represents the data rate and 24 bytes of speech. To select between decoders 2B on a frame by frame basis an additional byte (or bit if only 2 vocoders are used) is added to each frame to allow selection of the proper decoder 2B to use on the receiving end of the signal.

An exemplary decoder 2B receives a 25 byte packet from the processor 3 every 20 ms. Each decoded packet contains one byte that represents the data rate and 24 bytes of compressed data needed for reconstructing the speech. The decoder 2B provides an output of 160 8-bit speech samples, either $\mu$-Law or A-Law companded, every 20 ms to the PCM interface 4A. An additional byte (a bit if only two vocoders are used) is added to each frame to allow selection of the decoder to use to recover the transmitted speech. Various frame timing rates may also be used according to various vocoders. Switching may occur on a frame or a multi-frame basis.

The foregoing techniques can be used for a number of waveform coding techniques such as Adaptive Delta Pulse Code Modulation (ADPCM), continuously variable slope delta modulation (CVSD), sub-band coders, and other speech encoding techniques. This technique is also not exclusive to speech encoders, but may also be used for non-voice signals such as tone or music. The various vocoders may all be of a single type such as Codebook Excited Linear Prediction (CELP) or may be mixed types such as Linear Predictive Coding (LPC), Residual excited CPC (RELP), and vector sum excited LPC (VSELP).

Several algorithms can be used in a vocoder to determine coefficients of a Linear Predictive Coding (LPC), which is a method of predicting future samples of a sequence by a linear combination of the previous samples of the same sequence. A speech codec uses a "look ahead" of, by example, 200 of the 8,000 samples in order to allow a pitch frequency track to be computed using information in the next frame, and it also allows the LPC coefficients, the frame energy, and the voice activity to be computed for the next frame. This allows efficient multi-frame quantization of the Frame energy/LPC coefficients to be made. The LPC is then transformed into line spectral pair frequencies for quantization and interpolation.

LSP sensitivity is computed and used to further enhance the quantization process. Code Excited Linear Prediction (CELP) algorithms then operate to encode the signal. The encoding process determines the codebook excitation parameters and the pitch filter parameters which result in synthesized speech that resembles the original speech. The efficiency of this process determines how well the synthesized speech, when decoded, resembles the original speech when transmitted at a particular data rate. Variable rate codecs separate various portions of the structure of the voice into types which may include; transitions up and down, voiced, unvoiced, and single voiced. These types are then assigned various rates such as rate 1, rate ½, rate ¼ etc, and are then encoded using separate codebooks which better model that type of speech type. Fixed rate coders operate differently with a composite model encoded at a single rate. Generally the CELP mode use several pitch subframes in conjunction with the LPC interpolation and codebook subframes.

In a variable rate vocoder the full rate (e.g. 9600 bps) CELP may have LPC interpolation, pitch subframes and codebook subframes, while a rate ½ CELP (e.g. 4800 bps) may have LPC interpolation and codebook subframes. The rate ¼ CELP would have, by example, the LPC interpolated and several noise frames, and the rate 0 would only employ noise subframes.

The encoded signal for the frame, which includes the codebook excitation signal including the subframes, is then modulated and sent to the receiving unit where, after demodulation, the signal is processed in the decoder portion of the vocoder. The codebook excitation signal is selected from a set of possible signals, as a codebook search scaled by a gain factor, filtered by a pitch filter, and filtered by an LPC filter which introduces spectral shaping. The output of the LPC filter is the decoded synthesized speech signal. This signal is then sent to codec for digital to analog conversion.

In accordance with an aspect of this invention switching between various algorithms associated with either fixed or variable rate vocoders, which could use different codebooks and other processes associated with the speech reproduction, yields various quality speech reproduction at differing data rates. Selecting between the various algorithms would thus yield the beneficial results afforded by this invention.

This invention is also useful where various gateway installations have different vocoder implementations, thus allowing user terminals 16 to roam between them with each gateway 14 instructing the user terminals 16 as to which vocoder to use.

Automatic vocoder selection on the fly is also possible with this invention. In this mode of operation the selection of the decoder to be used during voice reconstruction is embedded within the frame structure.

Referring to Table 1, an exemplary frame command structure is shown.

TABLE 1

| BYTE # | VALUE | DESCRIPTION |
| --- | --- | --- |
| 0 | 00001101 | 27 bytes to follow |
| 1 | 00000010 | receive frame command |
| 2 | 0000ffff | frame data rate |
| 3 | 0000dddd | decoder to use |
| 4-1A | xxxxxxxx | data |
| 1B | cccccccc | 8-bit checksum |

In this example the value for command byte 3 specifies the decoder 2B to use for that frame, in response to decisions made by the encoding unit, either the UT 16 or the GW 14.

Automatic operation is similar to that of rate reduction in a facsimile machine which senses the noise on the line and reduces data rate sent to maintain the link. In the satellite telephone maintaining the link is important since faded conditions will occur more often than with terrestrial systems. Since the quality of the previous frame sent is known to the receiving end commands may be formed to send back to the other end to increase or decrease not only the power or the data rate, but which encoder to use on the transmit end. For terrestrial systems this can be nearly instantaneous, but with satellite systems this return instruction may take as long as 30 ms for non-geosynchronous systems and as much as 250 ms for geosynchronous systems. In non-geosynchronous systems this means that it will take as long as 1 or 2 frames for the transmit end to respond. For slowly changing conditions, such as blocking, this delay is acceptable since only perhaps the loss of one or two frames may occur. Once the receive end commands the transmit end to change to another encoder, at a particular time in the future, the receive end also changes to the same decoder at that time, plus the known delay due to the propagation over the link. Thresholds are preferably set to prevent thrashing of the system.

Figure 5:
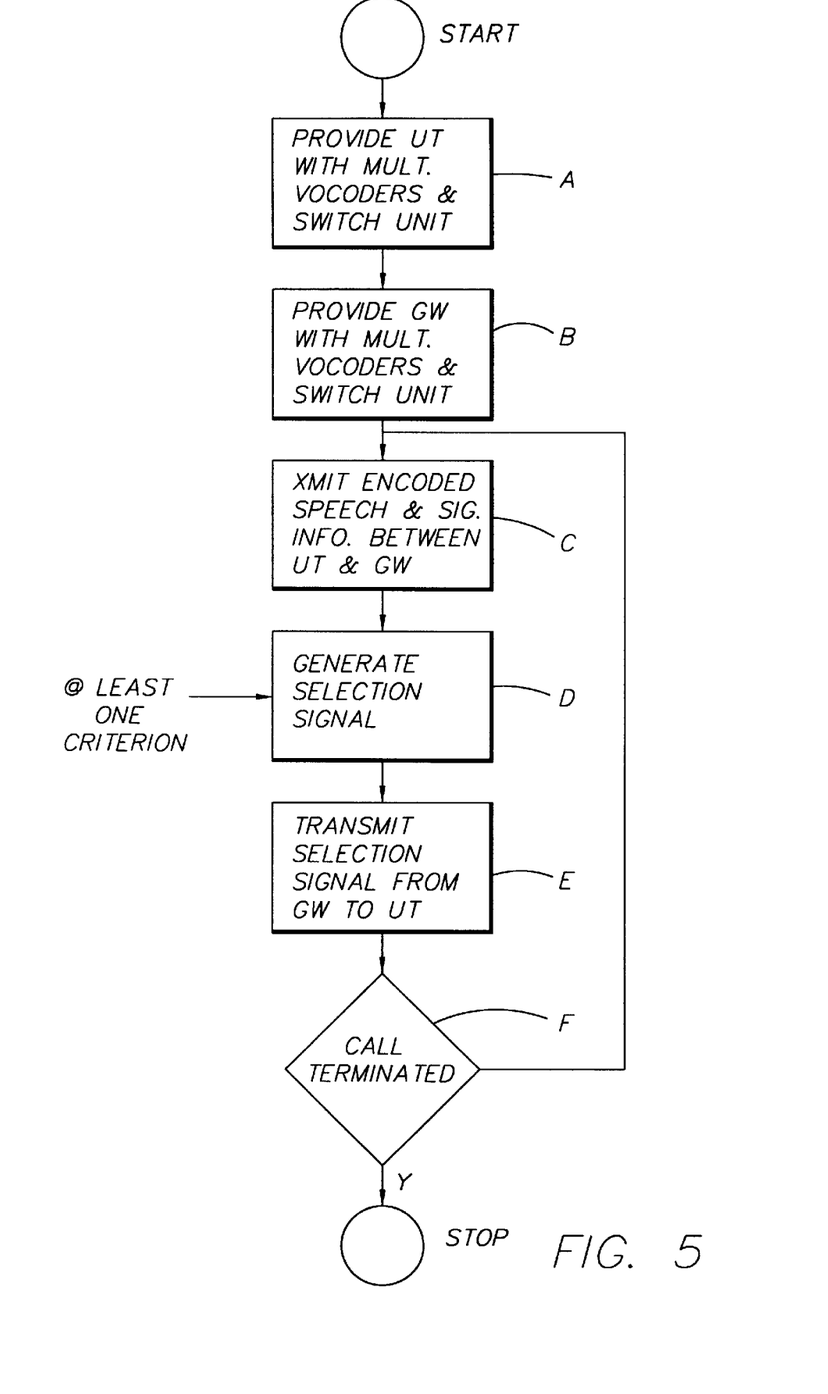
FIG. 5 is a logic flow diagram in accordance with a method of this invention.

It can be appreciated that an aspect of this invention is a method for operating a satellite communications system of a type that has at least one gateway, at least one user terminal, and at least one satellite for relaying at least speech and signalling information between the gateway and the user terminal over a communication link. Referring to FIG. 5, the method includes steps of (Step A) providing the user terminal with a plurality of encoders for encoding speech signals and with a first switching unit responsive to a first selection signal for enabling one of the encoders for operation at any given time; (Step B) providing the gateway with a plurality of decoders for decoding encoded speech signals received from the user terminal and with a second switching unit responsive to a second selection signal for enabling one of the decoders that corresponds to an enabled one of the encoders for operation at any given time; (Step C) transmitting and receiving encoded speech signals and also signalling information between the user terminal and the gateway over the communication link; (Step D) generating a selection signal based on at least one criterion; and (step E) transmitting the selection signal from the gateway to the user terminal over the communication link. Step F indicates that Steps C through E can be executed until the call is terminated.

Although described in the context of a number of embodiments, the teachings of this invention should not be construed to be limited to only these specific embodiments. By example, the teachings of this invention can be applied as well to terrestrial communications systems. Furthermore, if more than two vocoders are used then additional potential for link maintenance or increased capacity can be achieved. Also, it is not necessary that both the forward link and the return link be equipped with multiple switchable vocoders and/or encoder/decoder pairs, as the multiple switchable vocoders and/or encoder/decoder pairs can be used as well on one link only.

Thus, while the invention has been particularly shown and described with respect to preferred embodiments thereof, it will be understood by those skilled in the art that changes in form and details may be made therein without departing from the scope and spirit of the invention.

What is claimed is:

1. A communications system comprising:
    a first unit having a first transceiver coupled to a first controller, said first unit further comprising a plurality of encoders for encoding speech signals and a first switching unit being responsive to a first selection signal for enabling one of said encoders for operation at any given time; and
    a second unit having a second transceiver coupled to a second controller, said second unit further comprising a plurality of decoders for decoding encoded speech signals received from said first unit and a second switching unit being responsive to a second selection signal for enabling one of said decoders that corresponds to an enabled one of said encoders for operation at any given time, said first and second units transmitting and receiving encoded speech signals and also signalling information therebetween over an RF communication link, the signalling information including a selection signal command that is derived based on at least one criterion, wherein the at least one criterion is based on a predicted communications system load.

2. A communications system as in claim 1, wherein said first unit is a user terminal, wherein said second unit is a terrestrial gateway, and wherein said RF communication link is made through at least one satellite.

3. A communications system as in claim 1, wherein the at least one criterion is further based on a user selected voice quality.

4. A communications system as in claim 1, wherein said encoded speech signal is transmitted as frames, and wherein the selection signal command is generated at a frame rate or a multiple of the frame rate.

5. A communications system as in claim 2, wherein said RF communication link is one of a TDMA link, a CDMA link, or a FDMA link.

6. A communications system comprising:
a first unit having a first transceiver coupled to a first controller, said first unit further comprising a plurality of encoders for encoding speech signals and a first switching unit being responsive to a first selection signal for enabling one of said encoders for operation at any given time; and
a second unit having a second transceiver coupled to a second controller, said second unit further comprising a plurality of decoders for decoding encoded speech signals received from said first unit and a second switching unit being responsive to a second selection signal for enabling one of said decoders that corresponds to an enabled one of said encoders for operation at any given time, said first and second units transmitting and receiving encoded speech signals and also signalling information therebetween over an RF communication link, the signalling information including a selection signal command that is derived based on at least one criterion, wherein the at least one criterion is based on a charge state of a battery.

7. A communications system comprising:
a first unit having a first transceiver coupled to a first controller, said first unit further comprising a first plurality of vocoders for encoding and decoding speech signals and a first switching unit being responsive to a first selection signal for enabling one of said first plurality of vocoders for operation at any given time; and
a second unit having a second transceiver coupled to a second controller, said second unit further comprising a second plurality of vocoders for encoding and decoding speech signals received from said first unit and a second switching unit being responsive to a second selection signal for enabling one of said second plurality of vocoders that corresponds to an enabled one of said first plurality of vocoders for operation at any given time, said first and second units transmitting and receiving encoded speech signals, using the selected vocoders, and also signalling information therebetween over an RF communication link, the signalling information including a vocoder selection signal command that is derived based on at least one criterion, wherein the at least one criterion is based on a predicted communications system load.

8. A communications system as in claim 7, wherein said first unit is a user terminal, wherein said second unit is a terrestrial gateway, and wherein said RF communication link is made through at least one satellite.

9. A communications system as in claim 7, wherein the at least one criterion is further based on a user selected voice quality.

10. A communications system as in claim 8, wherein said RF communication link is one of a TDMA link, a CDMA link, or a FDMA link.

11. A communications system as in claim 7, wherein said encoded speech signal is transmitted as frames, and wherein the vocoder selection signal command is generated at a frame rate or a multiple of the frame rate.

12. A communications system as in claim 7, wherein a first one of the first and second plurality of vocoders is comprised of a variable rate vocoder, wherein a second one of the first and second plurality of vocoders is comprised of a fixed rate vocoder.

13. A communications system as in claim 12, wherein said fixed rate vocoder operates at an average data rate that is more or less than an average data rate of said variable rate vocoder.

14. A communications system as in claim 7, wherein a first set of vocoders is used to encode and decode speech signals transmitted from said first unit to said second unit, and wherein a second set of different vocoders is used to encode and decode speech signals transmitted from said second unit to said first unit.

15. A communications system comprising:
a first unit having a first transceiver coupled to a first controller, said first unit further comprising a first plurality of vocoders for encoding and decoding speech signals and a first switching unit being responsive to a first selection signal for enabling one of said first plurality of vocoders for operation at any given time; and
a second unit having a second transceiver coupled to a second controller, said second unit further comprising a second plurality of vocoders for encoding and decoding speech signals received from said first unit and a second switching unit being responsive to a second selection signal for enabling one of said second plurality of vocoders that corresponds to an enabled one of said first plurality of vocoders for operation at any given time, said first and second units transmitting and receiving encoded speech signals, using the selected vocoders, and also signalling information therebetween over an RF communication link, the signalling information including a vocoder selection signal command that is derived based on at least one criterion, wherein said first unit is a user terminal, wherein said second unit is a terrestrial gateway, wherein said RF communication link is made through at least one satellite, and wherein a first one of the first and second plurality of vocoders is comprised of a variable rate vocoder, wherein a second one of the first and second plurality of vocoders is comprised of a fixed rate vocoder, wherein said fixed rate vocoder is selected for use in order to conserve satellite power and to maintain or increase system capacity.

16. A communications system comprising:
a first unit having a first transceiver coupled to a first controller, said first unit further comprising a first plurality of vocoders for encoding and decoding speech signals and a first switching unit being responsive to a first selection signal for enabling one of said first plurality of vocoders for operation at any given time; and
a second unit having a second transceiver coupled to a second controller, said second unit further comprising a second plurality of vocoders for encoding and decoding speech signals received from said first unit and a second switching unit being responsive to a second selection signal for enabling one of said second plurality of vocoders that corresponds to an enabled one of said first plurality of vocoders for operation at any given time, said first and second units transmitting and receiving encoded speech signals, using the selected vocoders, and also signalling information therebetween over an RF communication link, the signalling information including a vocoder selection signal command that is derived based on at least one criterion, wherein the at least one criterion is based on a charge state of a battery.

17. A user terminal comprising:

an RF transceiver for transmitting modulated RF signals to and for receiving modulated RF signals from at least one satellite, the RF signals being modulated to convey speech and signalling information;

a signal processor coupled to said RF transceiver for demodulating said received RF signals to digital signals;

an audio unit for transponding speech signals with a user;

a plurality of different types of selectable speech encoders/decoders coupled between said signal processor and said audio unit; and a controller, responsive to signalling information received through said RF transceiver, for selecting during any particular frame of speech one of said plurality of encoders/decoders for coupling between said signal processor and said audio unit, wherein said signalling information is transmitted to said user terminal from a terrestrial gateway through said at least one satellite, and wherein an encoder/decoder selection component of said signalling information is generated in said gateway based on one or more criteria including a predicted communications load.

18. A user terminal as in claim 17, wherein said RF signals are modulated in accordance with one of a TDMA, a CDMA, or a FDMA technique.

19. A user terminal as in claim 17, wherein said at least one satellite is a non-geosynchronous orbit satellite.

20. A user terminal as in claim 17, wherein said encoder/decoder selection component of said signalling information is generated in said gateway is further based on one or more criteria including a presence of an RF signal impairment, a presence of a source of external RF interference, an actual communications load, a user selected voice quality, a signal quality received from the user terminal, and in response to a request transmitted from said user terminal.

21. A user terminal comprising:

an RF transceiver for transmitting modulated RF signals to and for receiving modulated RF signals from at least one satellite, the RF signals being modulated to convey speech and signalling information;

a signal processor coupled to said RF transceiver for demodulating said received RF signals to digital signals;

an audio unit for transponding speech signals with a user;

a plurality of speech vocoders coupled between said signal processor and said audio unit; and a controller, responsive to signalling information received through said RF transceiver, for selecting during any particular frame of speech at least one of said plurality of vocoders for coupling between said signal processor and said audio unit, wherein said signalling information is transmitted to said user terminal from a terrestrial gateway through said at least one satellite, and wherein a vocoder selection component of said signalling information is generated in said gateway based on one or more criteria including a predicted communications load.

22. A user terminal as in claim 21, wherein said RF signals are modulated in accordance with one of a TDMA, a CDMA, or a FDMA technique.

23. A user terminal as in claim 21, wherein said at least one satellite is a non-geosynchronous orbit satellite.

24. A user terminal as in claim 21, wherein said vocoder selection component of said signalling information is generated in said gateway based on one or more further criteria including a presence of an RF signal impairment, a presence of a source of external RF interference, an actual communications load, a user selected voice quality, a signal quality received from the user terminal, and in response to a request transmitted from said user terminal.

25. A user terminal comprising:

an RF transceiver for transmitting modulated RF signals to and for receiving modulated RF signals from at least one satellite, the RF signals being modulated to convey speech and signalling information;

a signal processor coupled to said RF transceiver for demodulating said received RF signals to digital signals;

an audio unit for transponding speech signals with a user;

a plurality of speech vocoders coupled between said signal processor and said audio unit; and a controller, responsive to signalling information received through said RF transceiver, for selecting during any particular frame of speech at least one of said plurality of vocoders for coupling between said signal processor and said audio unit, wherein a first one of said plurality of vocoders is comprised of a variable rate vocoder, wherein a second one of said plurality of vocoders is comprised of a fixed rate vocoder, and wherein said fixed rate vocoder operates at an average data rate that differs from an average data rate of said variable rate vocoder.

26. A method for operating a satellite communications system having at least one gateway, at least one user terminal, and at least one satellite for relaying at least speech and signalling information between the gateway and the user terminal over a communication link, comprising steps of:

providing the user terminal with a plurality of encoders for encoding speech signals and with a first switching unit responsive to a first selection signal for enabling one of the encoders for operation at any given time;

providing the gateway with a plurality of decoders for decoding encoded speech signals received from the user terminal and with a second switching unit responsive to a second selection signal for enabling one of the decoders that corresponds to an enabled one of the encoders for operation at any given time;

transmitting and receiving encoded speech signals and also signalling information between the user terminal and the gateway over the communication link;

generating a selection signal based on at least one criterion; and transmitting the selection signal from the gateway to the user terminal over the communication link, wherein said at least one criterion is based on a predicted communications load.

27. A method as in claim 26, wherein the at least one criterion is further based on a user selected voice quality.

28. A method as in claim 26, wherein the selection signal is generated at a speech frame rate or a multiple of the frame rate.

29. A method as in claim 26, wherein the plurality of encoders each form a part of one vocoder, and wherein the plurality of decoders each form a part of a second vocoder.

30. A method as in claim 26, wherein the plurality of encoders each form a part of one of a first plurality of vocoders, wherein the plurality of decoders each form a part of one of a second plurality of vocoders, wherein a first one of each of the first and second plurality of vocoders is selected for use for speech signals transmitted from the user terminal to the gateway, and wherein a second one of each of the first and second plurality of vocoders is selected for use for speech signals transmitted from the gateway to the user terminal.

31. A method for operating a satellite communications system having at least one gateway, at least one user terminal, and at least one satellite for relaying at least speech and signalling information between the gateway and the user terminal over a communication link, comprising steps of:

providing the user terminal with a plurality of encoders for encoding speech signals and with a first switching unit responsive to a first selection signal for enabling one of the encoders for operation at any given time;

providing the gateway with a plurality of decoders for decoding encoded speech signals received from the user terminal and with a second switching unit responsive to a second selection signal for enabling one of the decoders that corresponds to an enabled one of the encoders for operation at any given time;

transmitting and receiving encoded speech signals and also signalling information between the user terminal and the gateway over the communication link;

generating a selection signal based on at least one criterion; and transmitting the selection signal from the gateway to the user terminal over the communication link, wherein the at least one criterion is based on extending user terminal talk time.

32. A method for operating a satellite communications system having at least one gateway, at least one user terminal, and at least one satellite for relaying at least speech and signalling information between the gateway and the user terminal over a communication link, comprising steps of:

providing the user terminal with a plurality of encoders for encoding speech signals and with a first switching unit responsive to a first selection signal for enabling one of the encoders for operation at any given time;

providing the gateway with a plurality of decoders for decoding encoded speech signals received from the user terminal and with a second switching unit responsive to a second selection signal for enabling one of the decoders that corresponds to an enabled one of the encoders for operation at any given time;

transmitting and receiving encoded speech signals and also signalling information between the user terminal and the gateway over the communication link;

generating a selection signal based on at least one criterion; and transmitting the selection signal from the gateway to the user terminal over the communication link, wherein the at least one criterion is based on reducing power within a satellite beam.

33. A method for operating a satellite communications system having at least one gateway, at least one user terminal, and at least one satellite for relaying at least speech and signalling information between the gateway and the user terminal over a communication link, comprising steps of:

providing the user terminal with a plurality of encoders for encoding speech signals and with a first switching unit responsive to a first selection signal for enabling one of the encoders for operation at any given time;

providing the gateway with a plurality of decoders for decoding encoded speech signals received from the user terminal and with a second switching unit responsive to a second selection signal for enabling one of the decoders that corresponds to an enabled one of the encoders for operation at any given time;

transmitting and receiving encoded speech signals and also signalling information between the user terminal and the gateway over the communication link;

generating a selection signal based on at least one criterion; and transmitting the selection signal from the gateway to the user terminal over the communication link, wherein the plurality of encoders each form a part of one of a first plurality of vocoders, wherein the plurality of decoders each form a part of one of a second plurality of vocoders, wherein a first one of each of the first and second plurality of vocoders is comprised of a variable rate vocoder, wherein a second one of the first and second plurality of vocoders is comprised of a fixed rate vocoder, and wherein the fixed rate vocoder operates at an average data rate that differs from an average data rate of the variable rate vocoder.

* * * * *